(12) United States Patent
Park et al.

(10) Patent No.: US 6,771,615 B1
(45) Date of Patent: Aug. 3, 2004

(54) SYNCHRONIZATION APPARATUS AND METHOD FOR A RETURN LINK POWER CONTROL FOR SATELLITE SYSTEMS

(75) Inventors: Yunsang Park, Germantown, MD (US); Michael Parr, Del Mar, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 886 days.

(21) Appl. No.: 09/642,283

(22) Filed: Aug. 18, 2000

(51) Int. Cl.[7] .............................. H04J 3/06; H04L 7/00
(52) U.S. Cl. ...................... 370/318; 370/324; 370/350; 370/509; 375/240.28; 375/368; 455/13.4; 714/775; 714/776; 714/783
(58) Field of Search ............................... 370/321, 324, 370/350, 470, 471, 474, 503, 509, 514, 535, 316, 318; 375/240, 240.01, 240.24, 240.26, 240.28, 362, 365, 368; 455/12.1, 13.2, 13.4; 714/752, 775, 776, 781, 783, 789

(56) References Cited

U.S. PATENT DOCUMENTS

| | | | | |
|---|---|---|---|---|
| 4,397,020 A | * | 8/1983 | Howson | ..................... 370/510 |
| 4,928,274 A | * | 5/1990 | Gilhousen et al. | .......... 370/326 |
| 4,979,170 A | * | 12/1990 | Gilhousen et al. | .......... 370/321 |
| 5,381,425 A | * | 1/1995 | Bitzer et al. | ................. 714/793 |
| 5,483,539 A | * | 1/1996 | Kaufmann | ................... 370/509 |
| 5,493,282 A | * | 2/1996 | Petreye et al. | ............. 340/7.35 |
| 5,666,370 A | * | 9/1997 | Ganesan et al. | ............ 714/752 |

* cited by examiner

Primary Examiner—Alpus H. Hsu
(74) Attorney, Agent, or Firm—John T. Whelan

(57) ABSTRACT

An approach for providing message synchronization in a communication system is disclosed. Using a selected channel coding method (e.g., Golay coding), an encoder encodes a message for transmission over a communication channel. An interleaver applies a predetermined interleaving pattern to the encoded message. A mask pattern with a prescribed sequence of bits is applied to the interleaved message; the prescribed sequence is ordered to eliminate an all zeros bit pattern and an all ones bit pattern. A multiplexer multiplexes the masked message with data traffic over the communication channel. The masked message is segmented into multiple blocks of a fixed length. At the receiver side, the mask pattern is applied to the demultiplexed message. The message is de-interleaved and decoded to restore the original message. Such an approach synchronizes the message blocks without adding overhead bits for synchronization and has particular applicability to the synchronization of power control messages in a satellite communication system.

29 Claims, 9 Drawing Sheets

M = {1, 0, 0, 0, 0, 1, 0, 0, 0, 0, 1, 0}

SYNCHRONIZATION APPARATUS AND METHOD FOR A RETURN LINK POWER CONTROL FOR SATELLITE SYSTEMS

CROSS-REFERENCES TO RELATED APPLICATION

This application is related to, and claims the benefit of the earlier filing date of, U.S. Provisional Patent Application No. 60/192,177, filed Mar. 27, 2000, entitled "A Synchronization Apparatus and Method for a Return Link Power Control Message for Satellite Systems," the entirety of which is incorporated herein by reference.

BACKGROUND OF THE INVENTION

1. Field of the Invention

The present invention relates to communication systems, and is more particularly related to synchronizing segmented messages in a satellite communication system.

2. Discussion of the Background

Modern satellite communication systems provide a pervasive and reliable infrastructure to distribute voice, data, and video signals for global exchange and broadcast of information. These satellite communication systems have emerged as a viable alternative to terrestrial communication systems. A popular application, for instance, is direct television broadcasting, which has provided a competitive alternative to cable television systems. Irrespective of the application, a satellite communication system must be designed to support the largest possible traffic capacity, which can translate to lower cost per telephone circuit, or television service, for example, and thus, to increased revenue for the system operator. The largest factors that affect capacity of a satellite communication system are the satellite transmission power and bandwidth.

In addition to data traffic, control messages are transmitted over the satellite links to provide a number of necessary functions, such as session establishment/termination and power management. Power control messages are transmitted from the satellite to terminals (forward link), and from terminals to satellites (return link) to regulate the proper power requirements of the terminal. Satellite terminals transmit power control messages to the satellite to specify the proper amount of transmission power that the satellite terminals require to receive signals from the satellite without experiencing severe signal distortion. During fading conditions, such as rain or snow, the satellite terminals need greater power than under normal environmental conditions. In some situations, the satellite terminals may even reduce their power requirements if the weather is especially conducive to strong signal reception.

A control message is typically fragmented into a number of blocks or segments, which are multiplexed over a number of frames. Specifically, these power control messages are multiplexed with other data traffic in the return link of the satellite communication system. The receiver needs to determine which of the frames corresponds to the start of the messages. In the forward link, messages are synchronized to the frame numbers, such that the receiver knows, prior to their reception, which is the first frame of each message. However, in the return link, the messages are not synchronized to the frame numbering to minimize delay of the underlying control loops. As a result, message synchronization poses a problem, in that there is no guarantee that a message will be received in the correct sequence. Clearly, if the control message cannot be restored in the proper sequence, the message cannot be correctly interpreted (i.e., data corruption).

To ensure that these message blocks can be reordered properly, one conventional approach is to employ overhead bits that provide sequence numbers for each message block. In this manner, the receiver detects the start of the message by examining the sequence number of the message blocks; for example, a sequence number of one would indicate the beginning. Because control messages detract from the useful bandwidth of the satellite system, it is important to minimize or eliminate the use of overhead bits. Thus, a drawback with the traditional approach is that overhead bits are required to provide synchronization of the control messages, which effectively reduces system throughput. In another conventional system, the return link receiver synchronizes the message framing by observing the contents of the messages; however, this disadvantageously results in processing delays.

Based on the foregoing, there is a clear need for improved approaches to synchronizing messages.

There is also a need to increase the efficiency of the satellite system.

There is also a need to enhance transmission capacity.

Based on the need to maximize the useful bandwidth of a communication system, an approach for synchronizing messages without introducing overhead is highly desirable.

SUMMARY OF THE INVENTION

According to one aspect of the invention, a method is provided for performing message synchronization. The method includes encoding a message for transmission over a communication channel. In addition, the method encompasses interleaving the encoded message according to a predetermined interleaving pattern, and applying a mask pattern that has a prescribed sequence of bits to the interleaved message. The prescribed sequence is ordered to eliminate an all zero bit pattern and an all ones bit pattern. Further, the method includes segmenting the masked message into a plurality of blocks, in which each of the blocks has a fixed length. The method also includes multiplexing each of the blocks with data traffic for transmission over the communication channel. Under this approach, synchronization errors are reduced.

According to another aspect of the invention, a communication system for providing message synchronization comprises an encoder that is configured to encode a message for transmission over a communication channel. An interleaver is coupled to the encoder and is configured to interleave the encoded message according to a predetermined interleaving pattern. An adder is configured to add a mask pattern that has a prescribed sequence of bits to the interleaved message. The prescribed sequence is ordered to eliminate an all zero bit pattern and an all ones bit pattern. A multiplexer is configured to multiplex the masked message with data traffic for transmission over the communication channel. The masked message is segmented into a plurality of blocks, in which each of the blocks has a fixed length. The above arrangement advantageously provides enhanced system performance.

In yet another aspect of the invention, a computer-readable medium containing program instructions for execution on a computer system, which when executed by a computer, cause the computer system to perform method steps for providing message synchronization is disclosed. The method includes encoding a message for transmission over a communication channel. In addition, the method encompasses interleaving the encoded message according to a predetermined interleaving pattern, and applying a mask pattern that has a prescribed sequence of bits to the interleaved message. The prescribed sequence is ordered to eliminate an all zero bit pattern and an all ones bit pattern. Further, the method includes segmenting the masked message into a plurality of blocks, in which each of the blocks has a fixed length. The method also includes multiplexing each of the blocks with data traffic for transmission over the communication channel. This approach advantageously enhances system throughput.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention minimizes synchronization errors by using a combination of interleaving and masking patterns for a Golay block code, which is used as the coding technique for power control messages in the return link of a satellite communication system. An encoder, according to one embodiment, encodes a message for transmission over a communication channel. An interleaver circuit interleaves the encoded message according to a predetermined interleaving pattern. Next, an adding circuit adds a mask pattern that has a prescribed sequence of bits to the interleave message. In an exemplary embodiment, the message is a 12-bit message, in which a Golay encoding scheme provides a total of 24 bits for the encoded message. The mask pattern is 12 bits and is applied to the 12 least significant bits of the 24-bit encoded message to eliminate the all zeros and all ones bit patterns. A multiplexer multiplexes the mask message with data traffic; the mask message is segmented into multiple blocks of a fixed length. Two approaches are used to arrive at the interleaving pattern and the masking pattern. The first approach, which is more computationally intensive, finds an optimal interleaving and masking patterns for a given code word length. Alternatively, the second approach provides a sub-optimal technique to find the interleaving and masking patterns by determining the interleaving pattern and masking pattern on a block by block basis.

Although the present invention is discussed with respect to power control messages in a satellite communication system, it is recognized by one of ordinary skill in the art that the present invention has applicability to any type of data and communication system.

Figure 1:
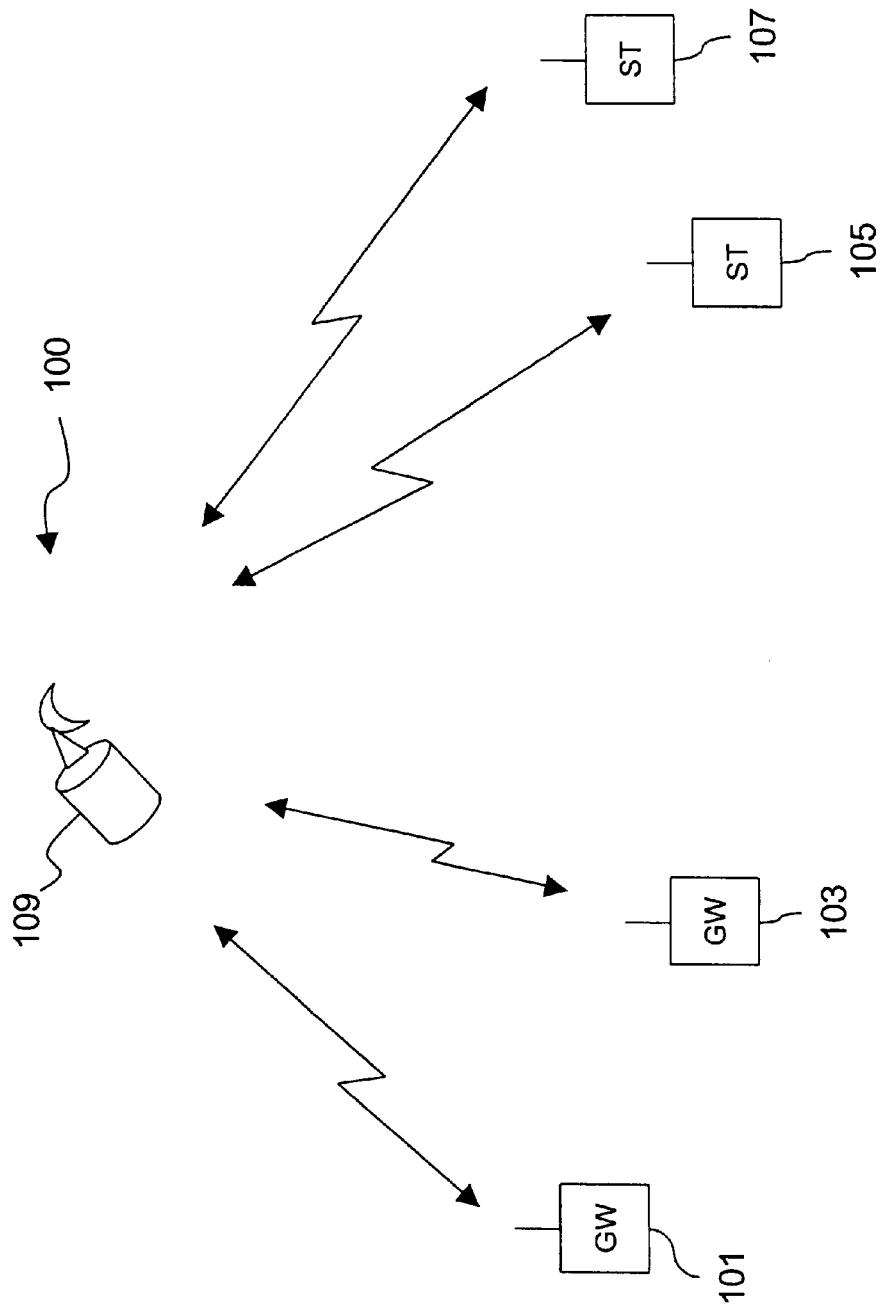
FIG. 1 is a block diagram of a satellite communication system with multiple gateway stations and terminals, in accordance with an embodiment of the present invention.

FIG. 1 shows a satellite communication system in accordance with one embodiment of the present invention. A satellite communication system 100 includes multiple gateway stations (GWs) 101 and 103 and numerous satellite terminals (STs) 105 and 107. Gateway stations 101 and 103 communicate with the terminals 105 and 107 via a communication satellite 109. The satellite communication system 100 also supports connectivity to a public switch telephone network (PSTN) (not shown), a public land mobile network (PLMN) (not shown), and a virtual private network (VPN) (not shown) to permit the terminals 105 and 107 to communicate with various terrestrial systems.

The terminals 105 and 107 (i.e., user terminals) provide the subscriber interface to the system 100. The terminal types may include hand held, vehicular, nomadic, and stationary units. Hand held terminals resemble traditional ground cellular units, which vehicular terminals include, for example, handsets that are docked to an external antenna, transmit power booster, and DC power source. Nomadic terminals are transportable, but not mobile; that is, nomadic terminals are fixed in place during operation. A nomadic terminal is equipped with a transportable antenna and are utilized for voice and data applications. Stationary terminals are equipped with directional antennas and can be configured to support a number of voice and data circuits (e.g., 1–8 circuits).

The gateway stations 101 and 103 manage and allocate system communication resources that are necessary to support the communication traffic within their respective service areas. For example, the gateway stations 101 and 103 can provide the following functions: management of the call set-up and tear down, generation of call records, allocation of communication resources within its service area (frequency and power), user authentication, support of user roaming within the system coverage area, and power management.

Power control messages, which are 24-bits in length after encoding, are exchanged between the satellite 109 and the gateway stations 101, 103 as well as the terminals 105, 107 to account for changing channel conditions. These messages are segmented and multiplexed over multiple frames. In the forward link (i.e., from the gateway stations 101, 103 to the terminals 105, 107), the multiple frames are synchronized to the frame numbers. The forward link power control message is synchronized by a modulo 6 frame number. This approach is not viable for the return link. In order to use the frame number at the return link for synchronization purposes, the return link power control message need to be held until the 0-synchronized frame (perhaps frame number 0) arrives. Consequently, the return link power control message should be held 2.5 frames (2.5×40 ms=100 ms) on average. In the worst case, the message should be held for 5 frames (5×40 ms=200 ms). Unfortunately, given the time sensitivity of the return link power control message, the frame number cannot be used for the return link. Therefore, for the return link, the power control message is sent regardless of the frame number.

The synchronization for the return link power control message is performed at the GW receiver. As will be more fully described later, synchronization in the return link (i.e., from the terminals 105, 107 to the gateway stations 101, 103) is provided using a combination of an interleaving pattern and a mask pattern according to the circuit of FIG. 2 and process of FIG. 3.

It is assumed that power control messages are not completely random in nature. In other words, from one message to the next, the message content does not change dramatically, but is changed incrementally. For example, the power control messages may specify incrementally step adjustments of +1, 0, or −1 dB.

The control messages are encoded using Golay coding, which exhibit excellent error detecting and correcting properties. However, because Golay coding is not self-synchronizing, the possibility exists that an incorrect synchronized point may be treated as the correct synchronized point, thereby resulting in errors. A self-synchronized code possesses the attribute that any permutation of the code word is not in the codebook. The following example depicts such a situation in which an incorrect synchronization point is interpreted as a correct one. For the purposes of explanation, it is assumed that 10 (message 1) and 00 (message 2) are the code words in the codebook of the Golay encoder and that messages are transmitted and received 1-bit blockwise. Message 1 and message 2 are sent consecutively from a satellite terminal; that is, the bits 1000 are sent. A GW, for example, receives a 1 (the $1^{st}$ bit) and waits until the next bit 0 ($2^{nd}$ bit) arrives. Thereafter, the GW decodes the received bits, 10, by comparing these bits to the code words in the code book; because 10 is a valid codeword (i.e., message 1), a "pass" ("P") is declared. Next, upon arrival of the $3^{rd}$ bit, which is a 0, the GW attempts to decode 00 (the $2^{nd}$ and $3^{rd}$ bits). Again the GW believes it has received a valid code word because 00 is in the code book (message 2); however, the GW should not have declared the received bits as a correct codeword because, in fact, the $3^{rd}$ bit is only the beginning of the next message. Once the $4^{th}$ bit arrives, the GW now examines the $3^{rd}$ and $4^{th}$ bits (00), decoding it has a valid codeword. In summary, the decoding decisions yielded three "passes" (i.e., PPP). In actuality, the decision at the decoder should have been "pass, fail, and pass" (i.e., PFP). The above example illustrates that non-self-synchronous codes (e.g., Golay codes) are problematic, in that the start and end of a message cannot be detected. As shown in the example, an error is generated because the sequence of the $2^2$ and $3^{rd}$ bits is also a code word.

As shown in the above example, an error will occur and the synchronization can be declared at the wrong point. Further the all zeros (0000) and all ones (1111) bit patterns fail to provide synchronization points. Suppose two all zeros messages are sent from the ST to the GW, the GW cannot synchronize this sequence, even if interleaving is employed as the permutation of an all zeros sequence results in an all zeros sequence. In recognition of these limitations, the present invention provides an approach that combines interleaving with masking to minimize or eliminate synchronization errors.

Figure 2:
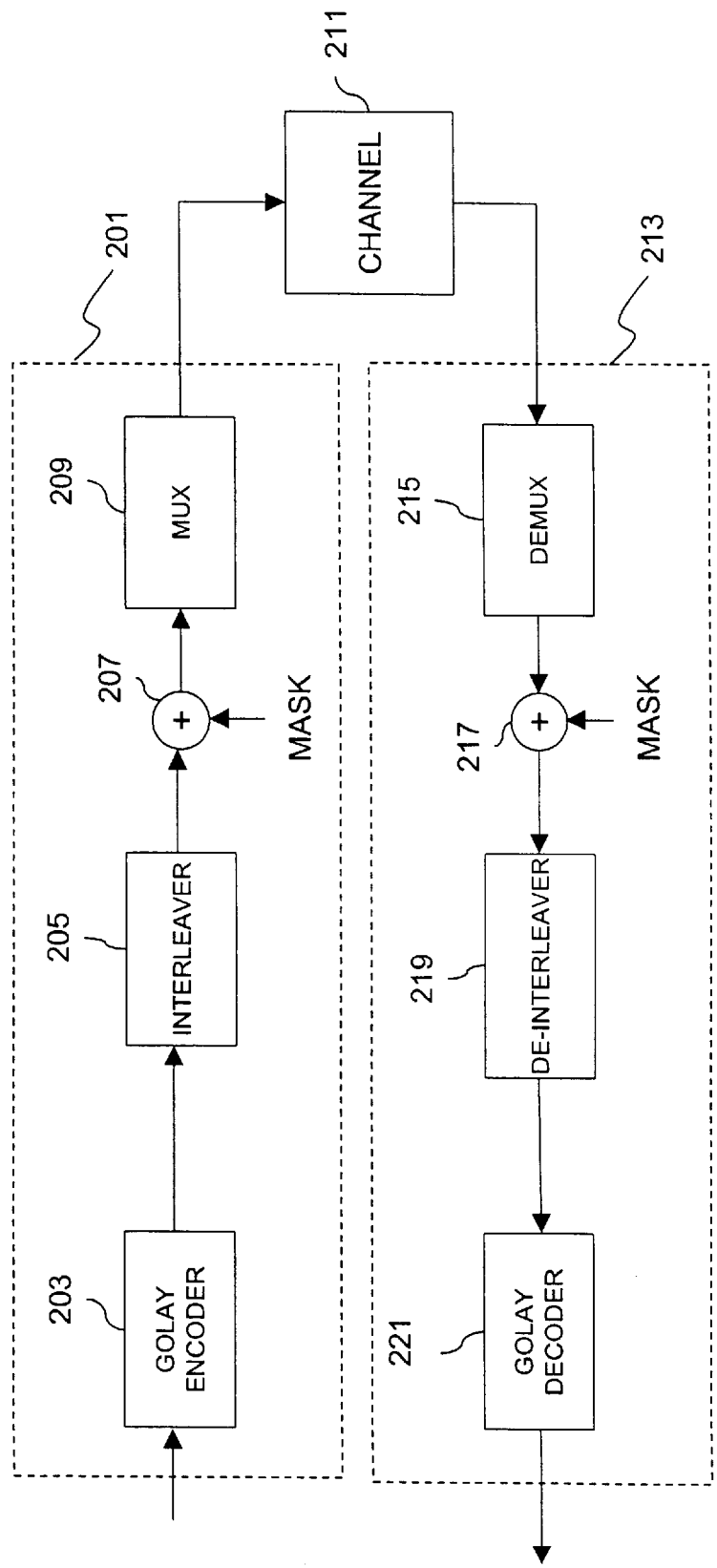
FIG. 2 is a functional block diagram of the transmitter and the receiver, in accordance with an embodiment of the present invention.

FIG. 2 shows a diagram of a transmitter and a receiver, according to an embodiment of the present invention. A transmitter 201 includes a Golay encoder 203 that outputs code words to an interleaver 205. The output of the interleaver 205 is sent to an adder 207 where a predetermined mask pattern is applied. The mask control message is multiplexed via multiplexer 209 blockwise according to a fixed length. In an exemplary embodiment, control messages are 12 bits in length. Further, the example in FIG. 2 utilizes a (24, 12) Golay encoder 203. Accordingly, the output of the Golay encoder 203 is an encoded message that is 24 bits in length. The multiplexer 209 multiplexes 4 bit blocks of the control message with data traffic across channel 211; that is, in this case, there are 6 4-bit blocks in a control message.

A receiver 213 exists to provide recovery of the original power control message. The receiver 213 includes a demultiplexer 215 for demultiplexing the received control message. The demultiplex control message is sent to an adder 217, in which a mask pattern is applied that is identical to the mask pattern used in the transmitter 201. The output of the adder 217 feeds a de-interleaver 219. Whenever the receiver 213 receives voice or data traffic, the receiver 213 demultiplexes a 4-bit power control block from the traffic and deinterleaves. Lastly, a Golay decoder 221 decodes the de-interleaved message to output a recovered control message. In particular, after deinterleaving, the decoder 221 decodes 12 MSBs (most significant bits) of the message and checks whether the 12 bits is a correct code word. (Since the Golay code is a systematic code, 12 MSBs should be the original code word and the remaining 12 bits should be the parity bits.) If 12 MSBs are in the code word, then compare the remaining 12 parity bits. If the parity is also matched, the receiver 213 regards the point at which the message arrived as a synchronized point, noting a "P (Pass)". Otherwise, receiver 213 designates the decoded message as "F (fail)". After decoding, majority voting will be performed to decide the synchronizing point. According to one embodiment of the present invention, the gateway stations 101, 103 and the terminals 105, 107 (FIG. 1) house transmitter 201 and receiver 213.

Figure 3:
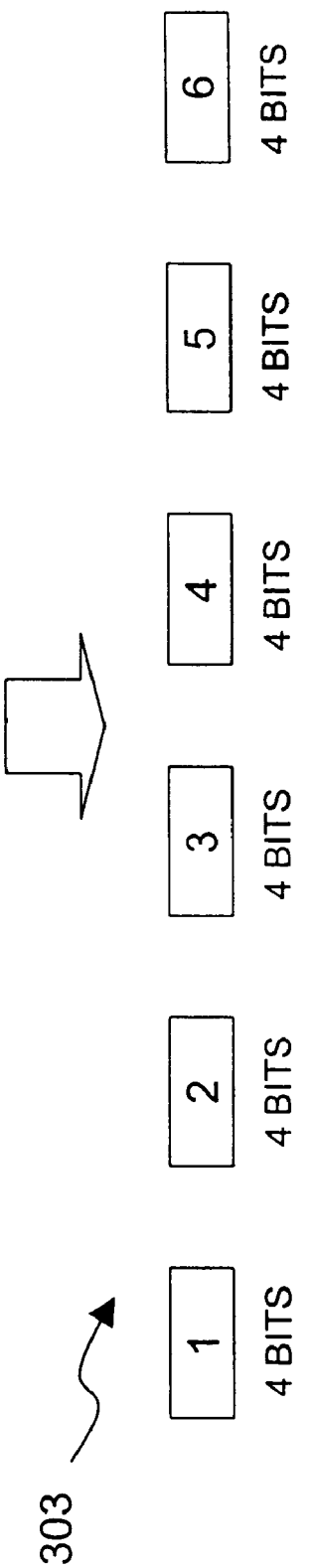
FIG. 3 is a diagram of the segmentation of the control message, according to an embodiment of the present invention.

FIG. 3 shows the segmentation of a 24-bit encoded control message, as used in the system of FIG. 2. A control message 301 has 24 bits after undergoing Golay encoding by Golay encoder 203 (FIG. 2). This 24-bit message 301 is segmented into 6 blocks 303 of a fixed length. In this exemplary embodiment, the fixed length is 4 bits. It should be noted that any length may be utilized. However, for computational efficiency reasons, a fixed length of 4 bits is chosen for the system of FIG. 2.

Figure 4:
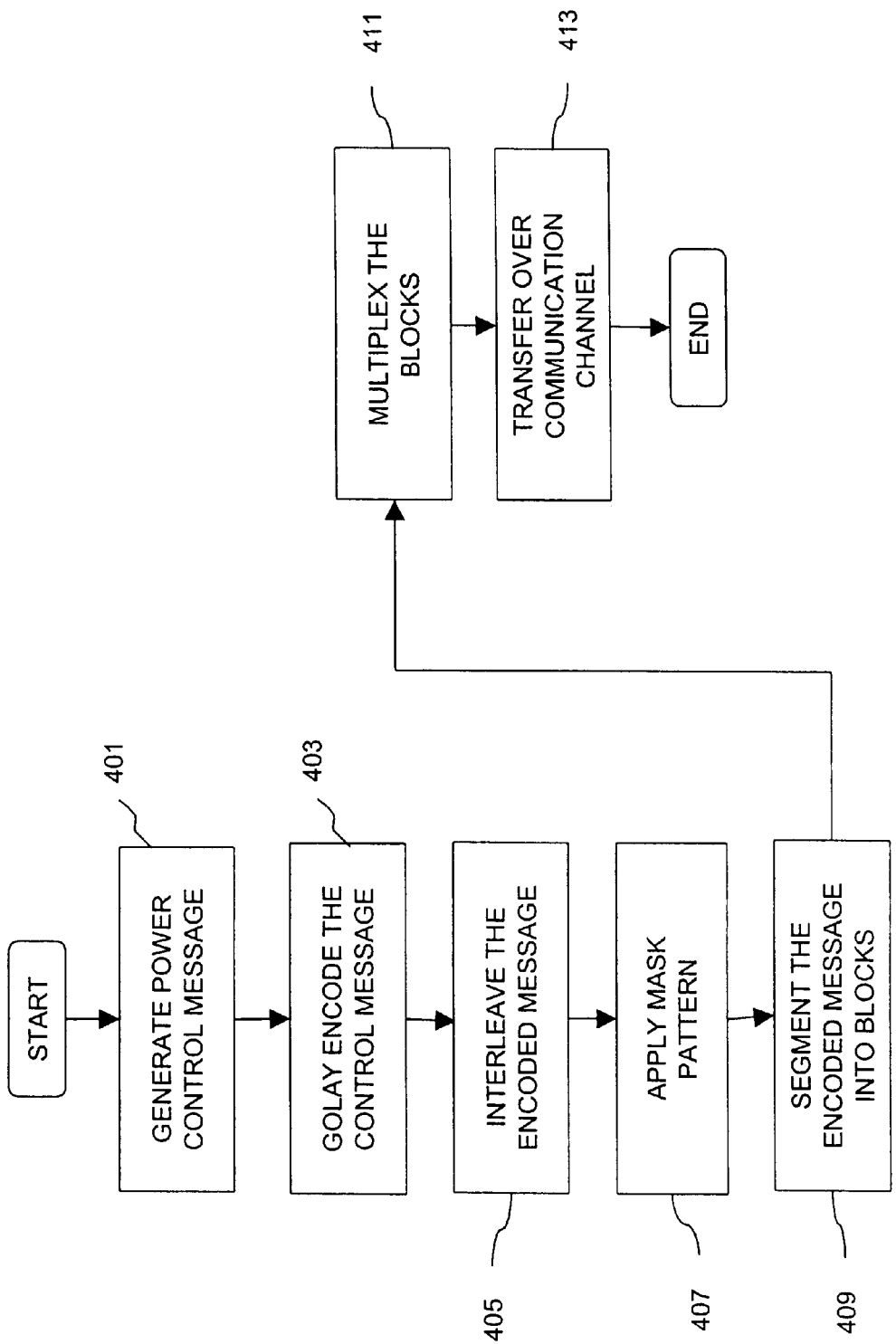
FIG. 4 is a flowchart of the interleaving and masking operation on the transmitting side, according to an embodiment of the present invention.

FIG. 4 shows a flow chart of the interleaving and masking operation on the transmitting side of the system in FIG. 2. In step 401, an ST 105, 107 generates a power control message that is destined to gateway station 101. A Golay encoder 203, within the receiver 213 of the gateway station 101, encodes the 12-bit control message, per step 403. As indicated above in an exemplary embodiment the Golay encoder utilizes (24, 12) Golay codes. Golay codes are considered perfect codes in that all possible patterns of a given number of errors can be corrected. Specifically, the (24, 12) code detects all patterns of 7 bit errors and corrects all patterns of 3 bit errors. This type of code has a minimum distance of 8. The details of the encoding and decoding process of Golay codes are described in Lin and Costello, "Error Control Coding: Fundamentals and Application," Prentice-Hall, Inc., 1983, pp. 134–138; which is incorporated herein by reference. Next, the encoded message is interleaved by interleaver 205 using a 24-bit interleaving pattern.

As an illustration of the importance of the choice of an interleaving pattern, turning to the previous decoding example as discussed in FIG. 1, the incorrect decision of "PPP" by the GW receiver 213 was made from the information sent by the ST 105, 107 (the ST intended the decoder decision to yield "PFP"). This error can be corrected by employing an interleaver 205 after the coding process to alter the bit pattern; that is, the interleaver 205 flips the first bit and second bit. Accordingly, a 10 will be 01 after the interleaving process. If the ST 105, 107 sends the 10 and 00 consecutively, this information will be 0100 after the interleaving process. The GW receiver 213 receives 0 ($1^{st}$ bit) and waits for the next bit to arrive; i.e., 1 ($2^{nd}$ bits). The GW receiver 213, then, deinterleaves 01 to 10. The received code word of 10 is compared with other code words, and is declared "P" since 10 is in the code book. When the GW receiver 213 receives the $3^{rd}$ bit, 0, the GW receiver 213 deinterleaves 10 ($2^{nd}$ and $3^{rd}$), yielding 01. This code word is decoded, and declared a "F" because 01 is not in the codebook. Upon receipt of the $4^{th}$ bit (0), with 00 ($3^{rd}$ and $4^{th}$ bits), the GW receiver 213 deinterleaves 00 to 00. The 00 code word is decoded and declared "P" because 00 is in the code book. Thus, with the introduction of an interleaver 205, the intended decoding decision is achieved, thereby eliminating the synchronization error. Therefore, determining an optimum interleaving sequence is important in reducing the number of synchronization errors.

In step 407, a mask pattern with a length of 12 bits is applied to the 24-bit interleave control message. The 12-bit mask pattern is applied to the 12 least significant bits (LSB) of the interleaved control message. The addition of this mask, according to an exemplary embodiment, is an XOR operation. The application of the 12-bit mask ensures that the all zero and all one bit patterns of the control messages are eliminated.

Next, in step 409, the encoded message at the output of adder 207 is segmented into multiple blocks of 4 bits. The blocks, as in step 411, are multiplexed with traffic data and transferred over a communication channel (step 413).

Figure 5:
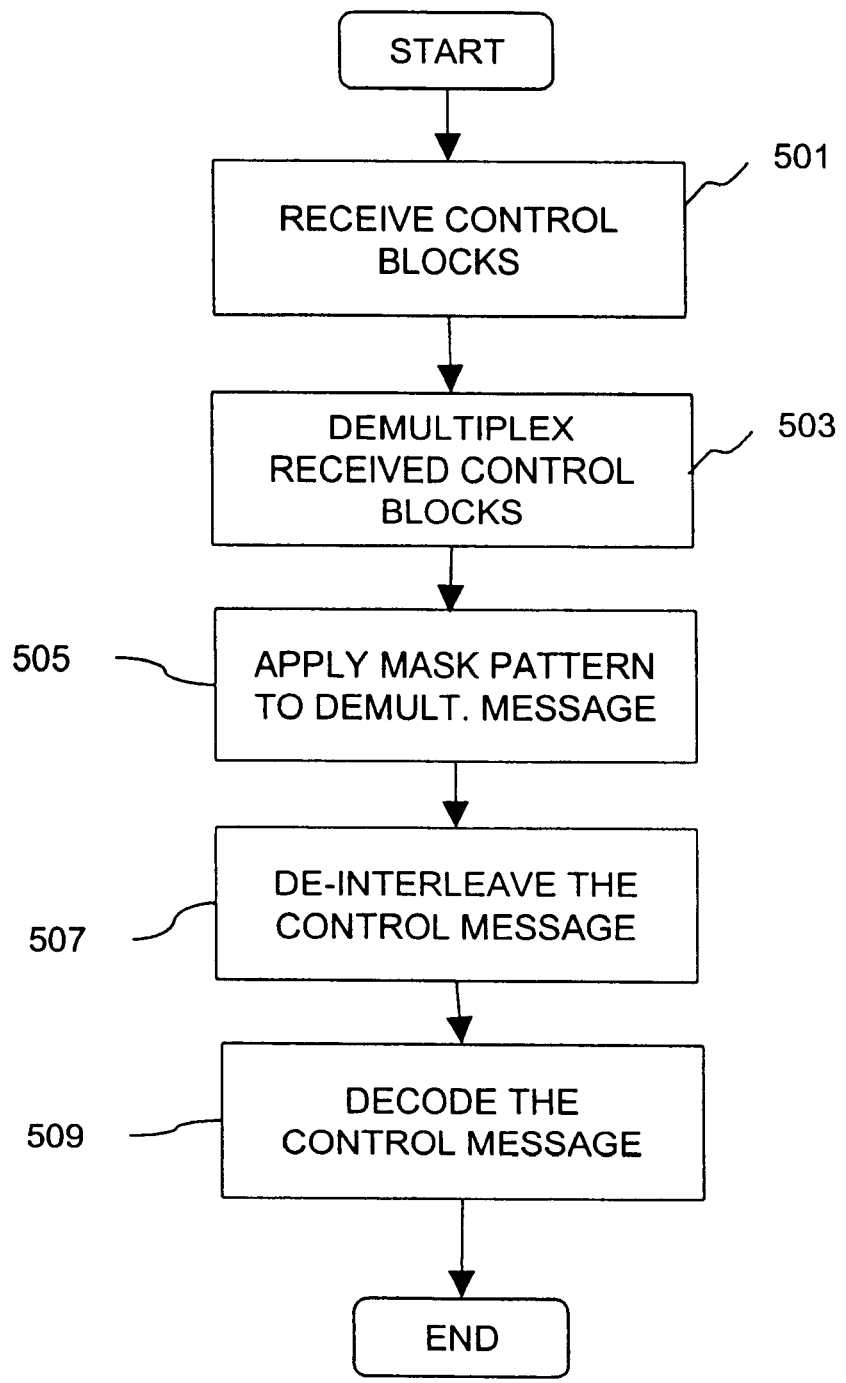
FIG. 5 is a flowchart of the masking and de-interleaving operation on the receiving side, according to an embodiment of the present invention.

FIG. 5 shows a flow chart of the masking and de-interleaving operation on the receiving side of the system of FIG. 2. In step 501, the multiplex signal is received across the transmission channel 211. These received blocks are then demultiplexed via the demultiplexer 215, per step 503. In step 505, a mask pattern is applied to the demultiplexed message, per step 505. Next, the de-interleaver 219, as in step 507, de-interleaves the received control message, outputting to the Golay decoder 221. In step 509, the Golay decoder 221 decodes the de-interleaved control message to restore the control message that was originally sent by transmitter 201.

Figure 6:
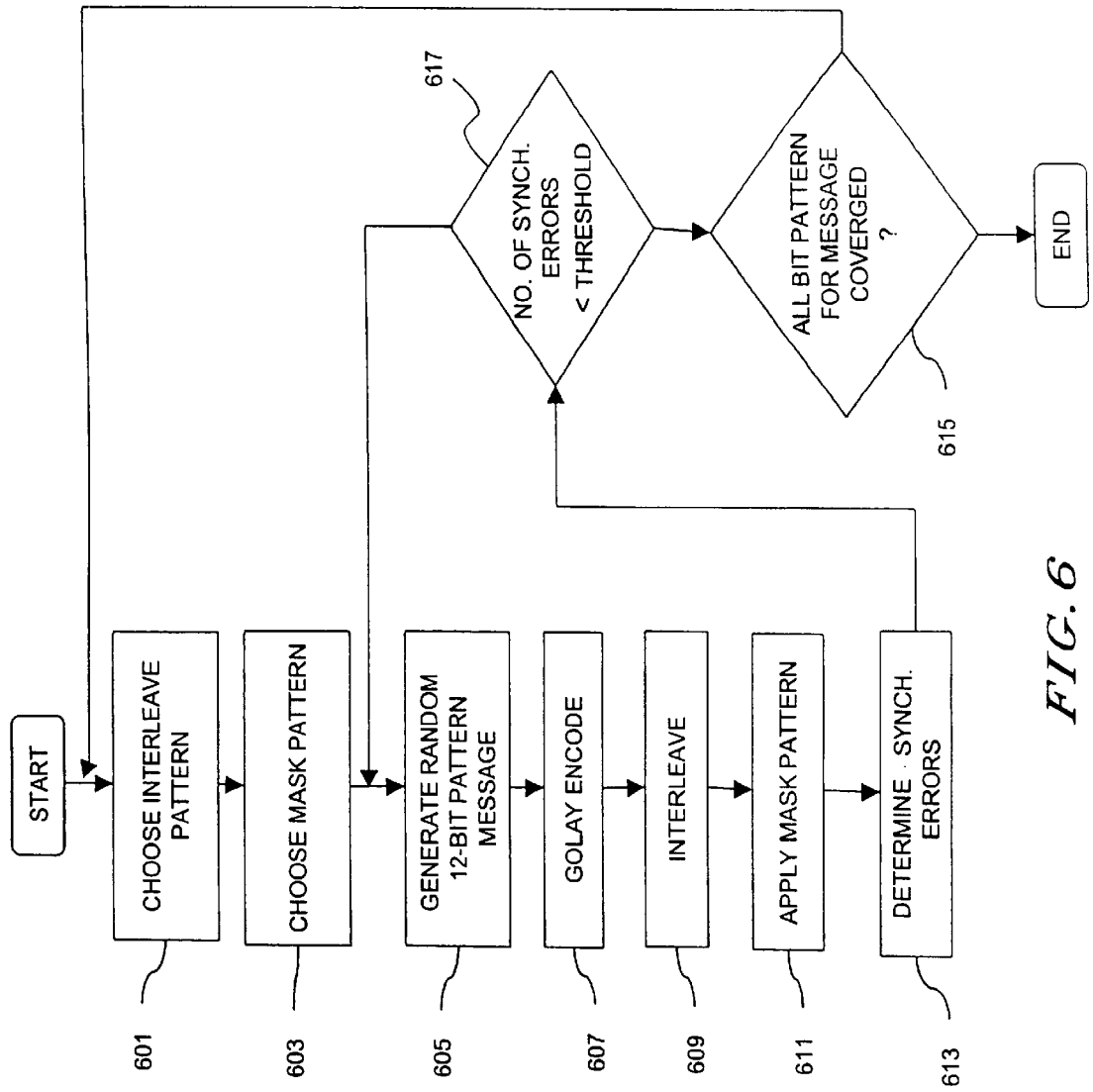
FIG. 6 is a flowchart of the operation of determining optimal interleaving and mask patterns, according to an embodiment of the present invention.

FIG. 6 shows a flow chart of the process for determining the optimal interleaving pattern and the optimal mask pattern, according to an embodiment of the present invention. Two of the objectives of this process are to determine the optimum interleaving pattern for reducing synchronization errors, as well as to eliminate synchronization errors from the all zeros or all ones cases. As illustrated previously, the choice of interleaving patterns impacts the number of synchronization errors. As will become clear, the selection of a mask pattern to compliment the interleaving pattern is also important.

In step 601, an initial interleaving pattern is chosen at random, for example. Next, a mask pattern is chosen at random as well (step 603). As previously mentioned, the interleaving pattern is 24 bits and the mask pattern is 12 bits. Next, in step 605 a 12-bit message is generated randomly. The random message, as in step 607, is Golay encoded to yield a 24-bit encoded message. The chosen interleaving pattern and the chosen mask pattern are applied to the encoded message, per steps 609 and 611, respectively. At this point these interleaving and mask patterns can be considered test patterns. In step 613, synchronization errors are computed based upon the restoration of the 12-bit random message using the test interleaving pattern and the test mask pattern. The number of computed synchronization errors are then compared to a predetermined threshold of synchronization errors. If the number of synchronization errors falls under the predetermined threshold (i.e., 1 or no errors), as in step 615, the algorithm checks whether all of the bit patterns for the message has been generated, per step 617. If all the bit patterns for the message have not been generated and tested with the interleaving and mask patterns, then steps 605–615 are repeated.

Turning back to step 615, if the number of synchronization errors exceeds the error threshold, another test interleaving pattern and test mask pattern are chosen and the steps 605–615 are repeated. The above approach is computationally intensive, given the length of the control message (which in this case is 12 bits). For a 24-bit code word, theoretically, 24! (6.2 ×$10^{23}$) interleaving patterns must be examined. Additionally, for a 12-bit mask pattern, there are $2^{12}$ (=4096) possible patterns to process. If processing power is a concern, then a sub-optimal approach can be used, as shown in FIG. 7.

Figure 7:
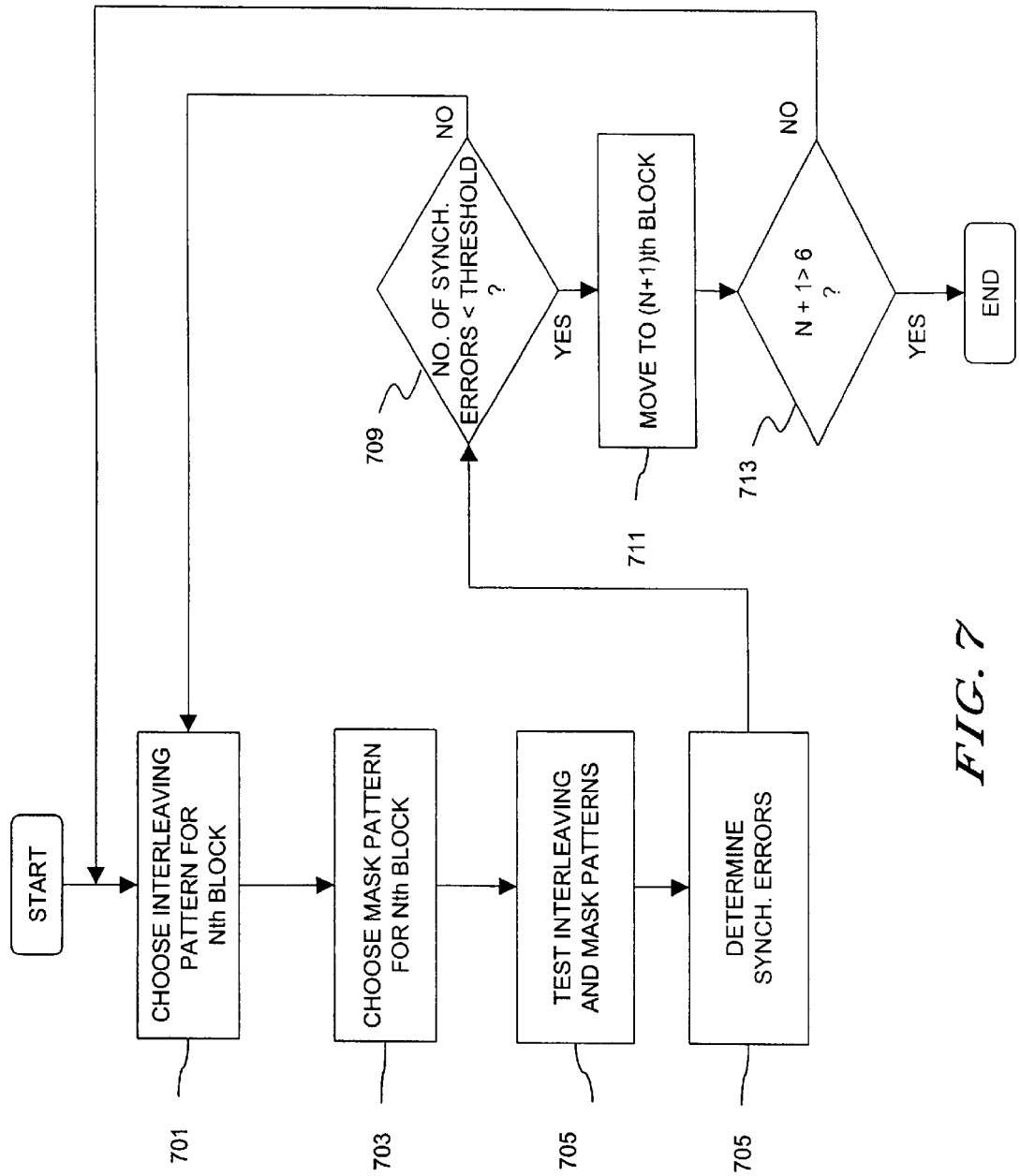
FIG. 7 is a flowchart of the operation of determining sub-optimal interleaving and mask patterns, according to an embodiment of the present invention.

FIG. 7 shows a flow chart of the operation of determining sub-optimal interleaving and mask patterns, according to an embodiment of the present invention. The approach of FIG. 7 computes the interleaving and masking patterns on a block by block basis. In other words, instead of computing the entire 24-bit pattern for the interleaving pattern and all possible 12-bit patterns for the mask pattern, the scheme of FIG. 7 divides the patterns into blocks of a fixed length. In an exemplary embodiment, the length is 4 bits; however, any number of block length can be used depending on available processing power. In general terms, the algorithm focuses on the first four least significant bits of each of the interleaving pattern and the mask pattern to determine the best patterns for these four bits. Thereafter, the next four least significant bits are examined, while maintaining the pattern that was previously determined. This process is performed iteratively until the full 24-bit interleaving pattern is determined as well as the full 12-bit mask pattern is determined.

As seen in FIG. 7, in step 701, an interleaving pattern for the nth block is chosen. Next, in step 703 the mask pattern for the nth block is also chosen. In step 705, the interleaving pattern and the mask pattern are tested; that is, steps 605–611 of FIG. 6 is performed. The synchronization errors, as in step 707, are then determined. In step 709, the algorithm determines whether the number of synchronization errors is less then a predetermined threshold. If the number of synchronization errors is an acceptable, then steps 701–707 are performed for a new test set of interleaving pattern and mask pattern for the nth block. However, if the synchronization errors are less than the threshold, the next block sequence (n+1) is examined, per step 711. In step 713, the algorithm checks whether the nth block was the last block in the block sequence for the interleaving pattern and the mask pattern. In the case in which six blocks are used, if n+1 is greater than 6, the process stops because the nth block was in fact the last block in the sequence. On the other hand, if this is not the last block sequence, then steps 701–711 are repeated until the last block sequence is processed.

Under the above sub-optimal approach, the total 24-bit sequence is permuted 4 bits, blockwise, at a time. Consequently, only 6! (720) scenarios are examined. As described above, after finding an optimal 4 bits, blockwise pattern, the elements of a block are permutated and examined; this process is repeated for all the blocks. With this approach, (4!)+(4!)+(4!)+(4!)+(4!)+(4!) (=144) patterns are examined. Computationally, to the total number of cases is only 864 (=720+144), for a 24-bit code word.

Figures 8A, 8B:
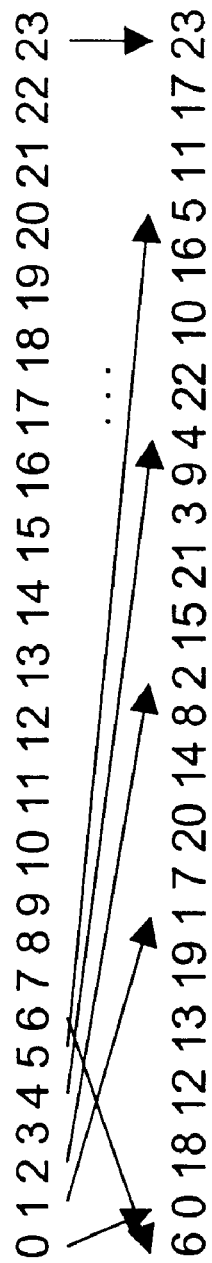
FIGS. 8A and 8B are diagrams of an interleaving pattern and a mask pattern, respectively, for a 24-bit Golay encoded message, according to an embodiment of the present invention.

FIGS. 8A and 8B show an interleaving pattern and a mask pattern, respectively, that are generated using the process of FIG. 7. In actual implementation, power control messages do not change randomly, but changes gradually (i.e., incrementally) according to a change in channel condition. Generally, three states exist from one power control message to the next such message: Case (1), the first and second messages are the same (self-permutation); Case (2), the second message is one above from the first message; and Case (3), the second message is one below from the first message. Further, a miscellaneous category, Case (4), "other", is provided to account for other possible scenarios.

Table 1 shows the number of errors for each the above cases in a conventional system, utilizing an interleaving pattern without masking. With respect to Case (1) errors, 10 errors occur with all zeros and all ones cases.

TABLE 1

| Case | (1) | (2) | (3) | (4) | Total Errors | Total Possible Sequences |
|---|---|---|---|---|---|---|
| # of Errors | 32 | 12 | 12 | 20424 | 20480 | 83,886,080 |

As seen in FIG. 8A, after Golay encoding, a block of 24 bits should be reorganized in the following order:

$$I=I_j=\{6,0,18,12,13,19,1,7,20,14,8,2,15,21,3,9,4,22,10,16,5,11,17,23\},$$

where j (j=1:24) is the bit order before the interleaver 205 (FIG. 2) and $I_j$ is the bit order after the interleaver 205. For example, the first bit of a Golay block before the interleaver 205 is located at the $6^{th}$ place after the interleaver 205.

The corresponding mask pattern is M={1,0,0,0,0,1,0,0,0,0,1,0}, as shown in FIG. 8B. This mask is added at the 12 LSB bits after the interleaver. At the receiver side of the GW 105, 107, the mask will be added one more time on the right before the deinterleaving process.

Table 2 shows the number of errors for each case using the above interleaving and mask pattern. For Case (1) errors, 10 errors stem from all zeros and all ones cases.

TABLE 2

| Case | (1) | (2) | (3) | (4) | Total Errors | Total Possible Sequences |
|---|---|---|---|---|---|---|
| # of Errors | 0 | 1 | 1 | 20478 | 20480 | 83,886,080 |

It should be noted that the total number of errors remains the same regardless of changes in the interleaving pattern or mask pattern. However, the number of errors for cases (1), (2), and (3) are clearly decreased with the above schemes.

The total possible sequence is 83,886,080, given the fact that there are 4096 (=$2^{12}$) code words. Each code word can be followed by any code word, and may shift five times since the decoder tries to decode whenever it receives 4 bits of block from the ST. Therefore, the probability of error that the decoder declares "P" with an incorrect synchronized sequence can be calculated as $2.44 \times 10^{-4}$ (=83,886,080/(4096×4096×5)).

Figure 9:
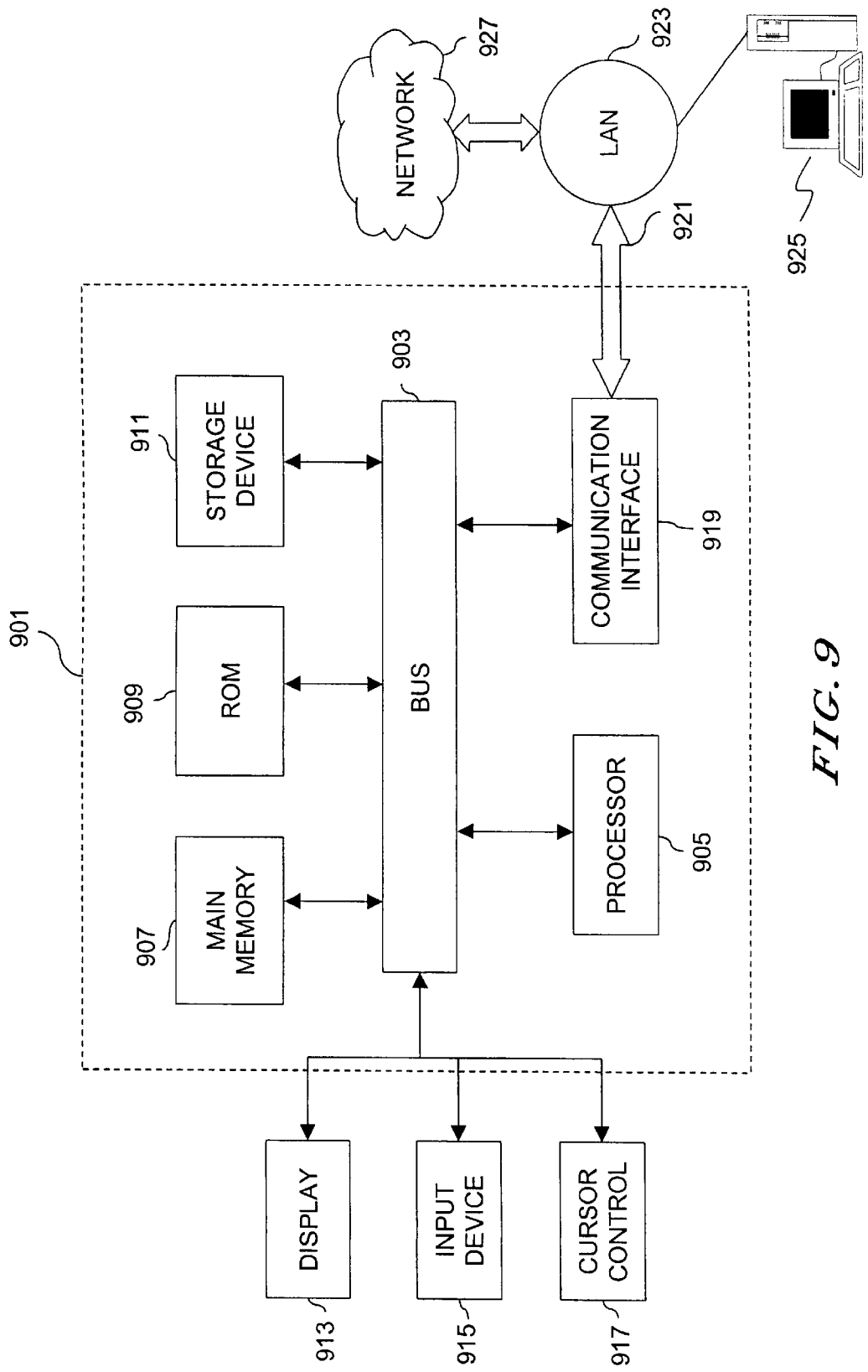
FIG. 9 is a diagram of a computer system that can generate the interleaving pattern and the mask pattern, in accordance with an embodiment of the present invention.

FIG. 9 illustrates a computer system 901 upon which an embodiment according to the present invention may be implemented to generate the sub-optimal interleaving and masking patterns. Computer system 901 includes a bus 903 or other communication mechanism for communicating information, and a processor 905 coupled with bus 903 for processing the information. Computer system 901 also includes a main memory 907, such as a random access memory (RAM) or other dynamic storage device, coupled to bus 903 for storing information and instructions to be executed by processor 905. In addition, main memory 907 may be used for storing temporary variables or other intermediate information during execution of instructions to be executed by processor 905. Computer system 901 further includes a read only memory (ROM) 909 or other static storage device coupled to bus 903 for storing static information and instructions for processor 905. A storage device 911, such as a magnetic disk or optical disk, is provided and coupled to bus 903 for storing information and instructions.

Computer system 901 may be coupled via bus 903 to a display 913, such as a cathode ray tube (CRT), for displaying information to a computer user. An input device 915, including alphanumeric and other keys, is coupled to bus 903 for communicating information and command selections to processor 905. Another type of user input device is cursor control 917, such as a mouse, a trackball, or cursor direction keys for communicating direction information and command selections to processor 905 and for controlling cursor movement on display 913.

According to one embodiment, synchronization of control messages is provided by computer system 901 in response to processor 905 executing one or more sequences of one or more instructions contained in main memory 907. Such instructions may be read into main memory 907 from another computer-readable medium, such as storage device 911. Execution of the sequences of instructions contained in main memory 907 causes processor 905 to perform the process steps described herein. One or more processors in a multi-processing arrangement may also be employed to execute the sequences of instructions contained in main memory 907. In alternative embodiments, hard-wired circuitry may be used in place of or in combination with software instructions. Thus, embodiments are not limited to any specific combination of hardware circuitry and software.

Further, the control logic to perform the offset operation may reside on a computer-readable medium. The term "computer-readable medium" as used herein refers to any medium that participates in providing instructions to processor 905 for execution. Such a medium may take many forms, including but not limited to, non-volatile media, volatile media, and transmission media. Non-volatile media includes, for example, optical or magnetic disks, such as storage device 911. Volatile media includes dynamic memory, such as main memory 907. Transmission media includes coaxial cables, copper wire and fiber optics, including the wires that comprise bus 903. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 905 for execution. For example, the instructions may initially be carried on a magnetic disk of a remote computer. The remote computer can load the instructions relating to the notification services to control call processing remotely into its dynamic memory and send the instructions over a telephone line using a modem. A modem local to computer system 901 can receive the data on the telephone line and use an infrared transmitter to convert the data to an infrared signal. An infrared detector coupled to bus 903 can receive the data carried in the infrared signal and place the data on bus 903. Bus 903 carries the data to main memory 907, from which processor 905 retrieves and executes the instructions. The instructions received by main memory 907 may optionally be stored on storage device 911 either before or after execution by processor 905.

Computer system 901 also includes a communication interface 919 coupled to bus 903. Communication interface 919 provides a two-way data communication coupling to a network link 921 that is connected to a local network 923. For example, communication interface 919 may be a network interface card to attach to any packet switched local area network (LAN). As another example, communication interface 919 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 919 sends and receives electrical, electromagnetic or optical signals that carry digital data streams representing various types of information.

Network link 921 typically provides data communication through one or more networks to other data devices. For example, network link 921 may provide a connection through local network 923 to a host computer 925 or to data equipment operated by a service provider, which provides data communication services through a communication network 927 (e.g., the Internet). LAN 923 and network 927 both use electrical, electromagnetic or optical signals that carry digital data streams. The signals through the various networks and the signals on network link 921 and through communication interface 919, which carry the digital data to and from computer system 901, are exemplary forms of carrier waves transporting the information. Computer system 901 can transmit notifications and receive data, including program code, through the network(s), network link 921 and communication interface 919.

The techniques described herein provide several advantages over prior approaches to transmission of power control messages in a satellite communication system. An interleaver in conjunction with an adder that applies a mask pattern provides an approach to synchronizing the control messages without the introduction of additional overhead bits or examination of the control messages themselves. For computational efficiency, a sub-optimal approach, according to an embodiment of the present invention, generates the interleaving and associated mask pattern on a block by block basis.

Obviously, numerous modifications and variations of the present invention are possible in light of the above teachings. It is therefore to be understood that within the scope of the appended claims, the invention may be practiced otherwise than as specifically described herein.

What is claimed is:

1. A method of performing message synchronization, the method comprising:

encoding a message for transmission over a communication channel;

interleaving the encoded message according to a predetermined interleaving pattern;

applying a mask pattern having a prescribed sequence of bits to the interleaved message, the prescribed sequence being ordered to eliminate an all zero bit pattern and an all ones bit pattern;

segmenting the masked message into a plurality of blocks, each of the blocks having a fixed length; and multiplexing each of the blocks with data traffic for transmission over the communication channel.

2. The method according to claim 1, further comprising:

receiving the multiplexed traffic from the communication channel;

demultiplexing the received multiplexed traffic to output a received encoded message;

applying the mask pattern to the received encoded message;

de-interleaving the received encoded message based upon the interleaving pattern; and decoding the de-interleaved message.

3. The method according to claim 2, further comprising:

generating the interleaving pattern and the mask pattern.

4. The method according to claim 2, wherein the generating step comprises:

(a) selecting a test interleaving pattern;

(b) selecting a test mask pattern;

(c) generating a random message having a random arrangement of bits;

(d) encoding the random message;

(e) applying the test interleaving pattern and the test mask pattern to the random message to output a test message;

(f) determining whether the test message is synchronized according to a predetermined threshold of number of synchronization errors;

(g) selecting another test interleaving pattern and another mask pattern based upon determining that the test message is not synchronized; and (h) repeating steps (a)–(g) until a final interleaving pattern and a final mask pattern is determined, wherein the final interleaving pattern yields synchronization errors in accordance with the predetermined threshold.

5. The method according to claim 4, wherein the steps (a)–(h) are performed on a block by block basis.

6. The method according to claim 1, wherein the encoding step utilizes Golay codes.

7. The method according to claim 1, wherein the encoding step utilizes non-synchronized block codes.

8. The method according to claim 1, wherein the message in the encoding step has a length of 12 bits, the encoded message in the interleaving step has a length of 24 bits, and the fixed length of each of the blocks in the segmenting step is 4 bits.

9. The method according to claim 8, wherein the interleaving pattern in the interleaving step is {6 0 18 12 13 19 1 7 20 14 8 2 15 21 3 9 4 22 10 16 5 11 17 23}.

10. The method according to claim 9, wherein the mask pattern in the applying step is {1, 0, 0, 0, 0, 1, 0, 0, 0, 0, 1, 0}.

11. A communication system for providing message synchronization, comprising:
- an encoder configured to encode a message for transmission over a communication channel;
- an interleaver coupled to the encoder and configured to interleave the encoded message according to a predetermined interleaving pattern;
- an adder configured to add a mask pattern having a prescribed sequence of bits to the interleaved message, the prescribed sequence being ordered to eliminate an all zero bit pattern and an all ones bit pattern; and
- a multiplexer configured to multiplex the masked message with data traffic for transmission over the communication channel, the masked message being segmented into a plurality of blocks, each of the blocks having a fixed length.

12. The system according to claim 11, further comprising:
- a demultiplexer configured to demultiplex the multiplexed traffic to output a received message;
- another adder coupled to the demultiplexer and configured to apply the mask pattern to the received encoded message;
- a de-interleaver coupled to the other adder and configured to de-interleave the received message based upon the interleaving pattern; and
- a decoder configured to recover an unencoded message.

13. The system according to claim 12, further comprising:
- a processor configured to generate the interleaving pattern and the mask pattern, the processor configured to perform the steps of,
  - (a) selecting a test interleaving pattern,
  - (b) selecting a test mask pattern,
  - (c) generating a random message having a random arrangement of bits;
  - (d) encoding the random message,
  - (e) applying the test interleaving pattern and the test mask pattern to the random message to output a test message,
  - (f) determining whether the test message is synchronized according to a predetermined threshold of number of synchronization errors,
  - (g) selecting another test interleaving pattern and another mask pattern based upon determining that the test message is not synchronized, and
  - (h) repeating steps (a)–(g) until a final interleaving pattern and a final mask pattern is determined, wherein the final interleaving pattern yields synchronization errors in accordance with the predetermined threshold; and
- a memory configured to store the interleaving pattern and the mask pattern.

14. The system according to claim 13, wherein the steps (a)–(h) are performed by the processor on a block by block basis.

15. The system according to claim 11, wherein the encoder utilizes Golay codes.

16. The system according to claim 11, wherein the encoder utilizes non-synchronized block codes.

17. The system according to claim 11, wherein the message has a length of 12 bits, the encoded message has a length of 24 bits, and the fixed length of each of the blocks is 4 bits.

18. The system according to claim 17, wherein the interleaving pattern is {7 0 19 12 13 20 1 8 22 15 8 2 16 23 3 9 4 24 10 17 6 11 18 25}.

19. The system according to claim 18, wherein the mask pattern is {1, 0, 0, 0, 0, 1, 0, 0, 0, 0, 1, 0}.

20. A computer readable medium containing program instructions for execution on a computer system, which when executed by a computer, cause the computer system to perform method steps for providing message synchronization, the method comprising the steps of:
- encoding a message for transmission over a communication channel;
- interleaving the encoded message according to a predetermined interleaving pattern;
- applying a mask pattern having a prescribed sequence of bits to the interleaved message, the prescribed sequence being ordered to eliminate an all zero bit pattern and an all ones bit pattern;
- segmenting the masked message into a plurality of blocks, each of the blocks having a fixed length; and
- multiplexing each of the blocks with data traffic for transmission over the communication channel.

21. The computer readable medium according to claim 20, wherein the computer readable medium further includes computer-executable instructions for causing the computer system to perform the steps of:
- receiving the multiplexed traffic from the communication channel;
- demultiplexing the received multiplexed traffic to output a received encoded message;
- applying the mask pattern to the received encoded message;
- de-interleaving the received encoded message based upon the interleaving pattern; and
- decoding the de-interleaved message.

22. The computer readable medium according to claim 21, wherein the computer readable medium further includes computer-executable instructions for causing the computer system to perform the step of:
- generating the interleaving pattern and the mask pattern.

23. The computer readable medium according to claim 21, wherein the generating step comprises:
- (a) selecting a test interleaving pattern;
- (b) selecting a test mask pattern;
- (c) generating a random message having a random arrangement of bits;
- (d) encoding the random message;
- (e) applying the test interleaving pattern and the test mask pattern to the random message to output a test message;
- (f) determining whether the test message is synchronized according to a predetermined threshold of number of synchronization errors;
- (g) selecting another test interleaving pattern and another mask pattern based upon determining that the test message is not synchronized; and
- (h) repeating steps (a)–(g) until a final interleaving pattern and a final mask pattern is determined, wherein the final interleaving pattern yields synchronization errors in accordance with the predetermined threshold.

24. The computer readable medium according to claim 23, wherein the steps (a)–(h) are performed on a block by block basis.

25. The computer readable medium according to claim 20, wherein the encoding step utilizes Golay codes.

26. The computer readable medium according to claim 20, wherein the encoding step utilizes non-synchronized block codes.

27. The computer readable medium according to claim 20, wherein the message in the encoding step has a length of 12 bits, the encoded message in the interleaving step has a length of 24 bits, and the fixed length of each of the blocks in the segmenting step is 4 bits.

28. The computer readable medium according to claim 27, wherein the interleaving pattern in the interleaving step is {6 0 18 12 13 19 1 7 20 14 8 2 15 21 3 9 4 22 10 16 5 11 17 23}.

29. The computer readable medium according to claim 28, wherein the mask pattern in the applying step is {1, 0, 0, 0, 0, 1, 0, 0, 0, 0, 1, 0}.

* * * * *